(12) United States Patent
Elenbaas et al.

(10) Patent No.: US 12,675,935 B2
(45) Date of Patent: Jul. 7, 2026

(54) OBJECT VISUALIZATION

(71) Applicant: KONINKLIJKE PHILIPS N.V.,
Eindhoven (NL)

(72) Inventors: Thijs Elenbaas, Nijmegen (NL); Robin Pieter De Paus, Breda (NL); Frans Henk Kremer, Eindhoven (NL); Paula Andrea Rudenick, Eindhoven (NL); Peggy Nachtigall, Knegsel (NL)

(73) Assignee: Koninklijke Philips N.V., Eindhoven (NL)

( * ) Notice: Subject to any disclaimer, the term of this patent is extended or adjusted under 35 U.S.C. 154(b) by 224 days.

(21) Appl. No.: 18/038,500

(22) PCT Filed: Nov. 24, 2021

(86) PCT No.: PCT/EP2021/082731
§ 371 (c)(1),
(2) Date: May 24, 2023

(87) PCT Pub. No.: WO2022/122377
PCT Pub. Date: Jun. 16, 2022

(65) Prior Publication Data
US 2024/0013468 A1 Jan. 11, 2024

(30) Foreign Application Priority Data
Dec. 8, 2020 (EP) .................................... 20212510

(51) Int. Cl.
*G06T 15/00* (2011.01)
*G06T 5/50* (2006.01)
(Continued)

(52) U.S. Cl.
CPC ................ *G06T 15/00* (2013.01); *G06T 5/50* (2013.01); *G06T 7/30* (2017.01); *G06V 10/25* (2022.01);
(Continued)

(58) Field of Classification Search
CPC .. G06T 15/00; G06T 7/30; G06T 5/50; G06T 2207/10116; G06T 2207/20221;
(Continued)

(56) References Cited

U.S. PATENT DOCUMENTS 9,892,812 B2 * 2/2018 Zheng .................. G02B 21/367
10,477,191 B2 11/2019 Kuribayashi
(Continued)

FOREIGN PATENT DOCUMENTS

DE 102008054298 A1 5/2010
JP 2013022411 A 2/2013
(Continued)

OTHER PUBLICATIONS

International Search report and Written Opinion of PCT/EP2021/082731, dated May 13, 2022.
(Continued)

*Primary Examiner* — Abderrahim Merouan

(57) ABSTRACT
An object visualization device comprising an image supply, a data processor, and an output. The image supply provides a 2D X-ray image and 3D image data of the object. The data processor registers the 3D image data to the 2D X-ray image, detects a viewing direction used for generating the 2D X-ray image, determines a viewing direction for projecting the 3D image data to generate a matching view of the 3D image data, generates a pair of stereoscopic images of the 3D image data for the determined viewing direction, and combines the 2D X-ray image with one of the images of the pair of stereoscopic images resulting in an augmented first stereoscopic image. The output provides the augmented first stereoscopic image and the generated second stereoscopic image as an enhanced pair of stereoscopic images providing an augmented 3D view of the object.

20 Claims, 3 Drawing Sheets

(51) Int. Cl.

| | |
|---|---|
| *G06T 7/30* | (2017.01) |
| *G06V 10/25* | (2022.01) |
| *H04N 13/117* | (2018.01) |
| *H04N 13/344* | (2018.01) |
| *H04N 23/30* | (2023.01) |

(52) U.S. Cl.
CPC ......... *H04N 13/117* (2018.05); *H04N 13/344* (2018.05); *H04N 23/30* (2023.01); *G06T 2207/10116* (2013.01); *G06T 2207/20221* (2013.01)

(58) Field of Classification Search
CPC .... H04N 13/117; H04N 13/344; H04N 23/30; G06V 10/25
See application file for complete search history.

(56) References Cited

U.S. PATENT DOCUMENTS

| | | | | |
|---|---|---|---|---|
| 10,631,712 B2 * | 4/2020 | King | A61B 1/0005 | |
| 11,406,338 B2 * | 8/2022 | Tolkowsky | A61B 6/466 | |
| 12,106,497 B2 * | 10/2024 | Lin | G06T 7/30 | |
| 2003/0081720 A1 * | 5/2003 | Swift | H04N 13/254 | 348/E13.008 |
| 2003/0113006 A1 * | 6/2003 | Berestov | G06T 7/80 | 382/131 |
| 2004/0062346 A1 * | 4/2004 | Fernandez | G01V 5/228 | 378/57 |
| 2004/0208279 A1 * | 10/2004 | Xiao | G03C 9/00 | 378/41 |
| 2005/0147199 A1 * | 7/2005 | Dunham | A61B 6/032 | 378/5 |
| 2005/0207529 A1 * | 9/2005 | Boese | A61B 6/022 | 378/41 |
| 2006/0245620 A1 * | 11/2006 | Roques | B64D 45/0056 | 382/115 |
| 2007/0110289 A1 * | 5/2007 | Fu | G06V 10/24 | 382/128 |
| 2008/0119728 A1 * | 5/2008 | Frenkel | A61B 6/5235 | 600/426 |
| 2009/0238334 A1 * | 9/2009 | Brahme | A61B 6/4092 | 378/41 |
| 2009/0257551 A1 * | 10/2009 | Dafni | A61B 6/4014 | 378/9 |
| 2009/0274271 A1 * | 11/2009 | Pfister | A61B 90/13 | 378/65 |
| 2010/0022874 A1 * | 1/2010 | Wang | A61B 34/20 | 600/427 |
| 2010/0172469 A1 * | 7/2010 | Poulsen | A61B 6/583 | 378/65 |
| 2010/0194861 A1 * | 8/2010 | Hoppenstein | H04N 13/243 | 348/48 |
| 2011/0282189 A1 | 11/2011 | Graumann | | |
| 2012/0035470 A1 * | 2/2012 | Kuduvalli | A61B 6/032 | 600/427 |
| 2012/0063565 A1 * | 3/2012 | Klingenbeck | A61B 6/488 | 378/9 |
| 2012/0076264 A1 * | 3/2012 | Ohta | A61B 6/022 | 378/62 |
| 2013/0293687 A1 | 11/2013 | Seto | | |
| 2013/0293690 A1 * | 11/2013 | Olson | G06F 3/011 | 348/56 |
| 2013/0322594 A1 * | 12/2013 | Tsujii | A61B 6/022 | 378/41 |
| 2014/0139526 A1 * | 5/2014 | Kim | G06T 7/0012 | 345/424 |
| 2014/0185748 A1 * | 7/2014 | Lee | A61B 6/461 | 378/41 |
| 2014/0185750 A1 * | 7/2014 | Sung | A61B 6/482 | 378/41 |

| | | | | |
|---|---|---|---|---|
| 2015/0063537 A1 * | 3/2015 | Lee | A61B 6/4007 | 378/41 |
| 2015/0071405 A1 * | 3/2015 | Jacobs | A61B 6/022 | 378/41 |
| 2015/0085975 A1 * | 3/2015 | Kato | G16H 50/20 | 382/132 |
| 2015/0085981 A1 * | 3/2015 | Siewerdsen | A61B 90/37 | 378/63 |
| 2015/0125033 A1 * | 5/2015 | Murphy | G06T 7/251 | 382/103 |
| 2015/0172516 A1 * | 6/2015 | Steinhauser | A61B 6/022 | 348/43 |
| 2015/0237327 A1 * | 8/2015 | Rustici | H04N 13/254 | 378/20 |
| 2015/0305701 A1 * | 10/2015 | Wendler | A61B 6/037 | 600/436 |
| 2015/0342546 A1 * | 12/2015 | Zaiki | A61B 6/503 | 378/62 |
| 2016/0078620 A1 * | 3/2016 | Iwanaka | G06T 7/74 | 600/424 |
| 2016/0191887 A1 * | 6/2016 | Casas | H04N 13/156 | 348/47 |
| 2016/0225180 A1 * | 8/2016 | Chang | G06T 15/20 | |
| 2017/0052125 A1 * | 2/2017 | Georgeson | G01N 23/20025 | |
| 2017/0099479 A1 * | 4/2017 | Browd | G06F 3/011 | |
| 2017/0164920 A1 * | 6/2017 | Lavallee | A61B 6/032 | |
| 2017/0178349 A1 * | 6/2017 | Ketcha | G06T 7/33 | |
| 2017/0343698 A1 * | 11/2017 | An | G01V 5/232 | |
| 2017/0361128 A1 * | 12/2017 | Lachaine | G01R 33/4824 | |
| 2018/0040147 A1 * | 2/2018 | Alhrishy | A61B 6/5205 | |
| 2018/0048884 A1 * | 2/2018 | De Zwart | H04N 13/317 | |
| 2018/0279883 A1 * | 10/2018 | Navab | A61B 6/5247 | |
| 2018/0310898 A1 * | 11/2018 | Ahn | A61B 6/542 | |
| 2018/0310907 A1 | 11/2018 | Zhang et al. | | |
| 2019/0289284 A1 * | 9/2019 | Smith | A61B 1/000095 | |
| 2019/0327394 A1 * | 10/2019 | Ramirez Luna | A61B 34/77 | |
| 2019/0350657 A1 * | 11/2019 | Tolkowsky | A61B 90/39 | |
| 2019/0360949 A1 * | 11/2019 | Izhutov | G01N 23/05 | |
| 2020/0121267 A1 * | 4/2020 | Deutschmann | A61B 6/4452 | |
| 2020/0237319 A1 * | 7/2020 | Yi | G06T 7/0012 | |
| 2020/0265618 A1 * | 8/2020 | Chen | G16H 50/50 | |
| 2020/0306476 A1 * | 10/2020 | Popa-Simil | A61M 16/044 | |
| 2020/0372714 A1 | 11/2020 | Soryal et al. | | |
| 2021/0150704 A1 * | 5/2021 | Bruening | A61B 6/0492 | |
| 2022/0065801 A1 * | 3/2022 | Chen | G01N 23/2251 | |
| 2022/0142722 A1 * | 5/2022 | Koza | G06F 3/0334 | |
| 2022/0287676 A1 * | 9/2022 | Steines | A61B 90/37 | |
| 2023/0240628 A1 * | 8/2023 | Cohen | A61B 6/4441 | 382/128 |
| 2023/0258587 A1 * | 8/2023 | Burgess | H01J 37/244 | 250/307 |
| 2023/0353879 A1 * | 11/2023 | Nishide | A61B 1/00177 | |
| 2024/0013468 A1 * | 1/2024 | Elenbaas | H04N 13/117 | |
| 2024/0046490 A1 * | 2/2024 | Lang | A61B 34/25 | |
| 2024/0153134 A1 * | 5/2024 | Kompatscher | A61N 5/1049 | |
| 2024/0170248 A1 * | 5/2024 | Podhola | H01J 29/563 | |
| 2025/0072975 A1 * | 3/2025 | Cazier | A61B 90/39 | |

FOREIGN PATENT DOCUMENTS

| | | | |
|---|---|---|---|
| WO | 2008060289 A1 | 5/2008 | |
| WO | 2012080961 A1 | 6/2012 | |
| WO | 2018097831 A1 | 5/2018 | |

OTHER PUBLICATIONS

Navab, et al.: "Merging Visible and Invisible: Two Camera-Augmented Mobile C-arm (CAMC) Applications", IWAR 1999: Proceedings of the 2nd IEEE and ACM International Workshop on Augmented Reality, p. 134.

* cited by examiner

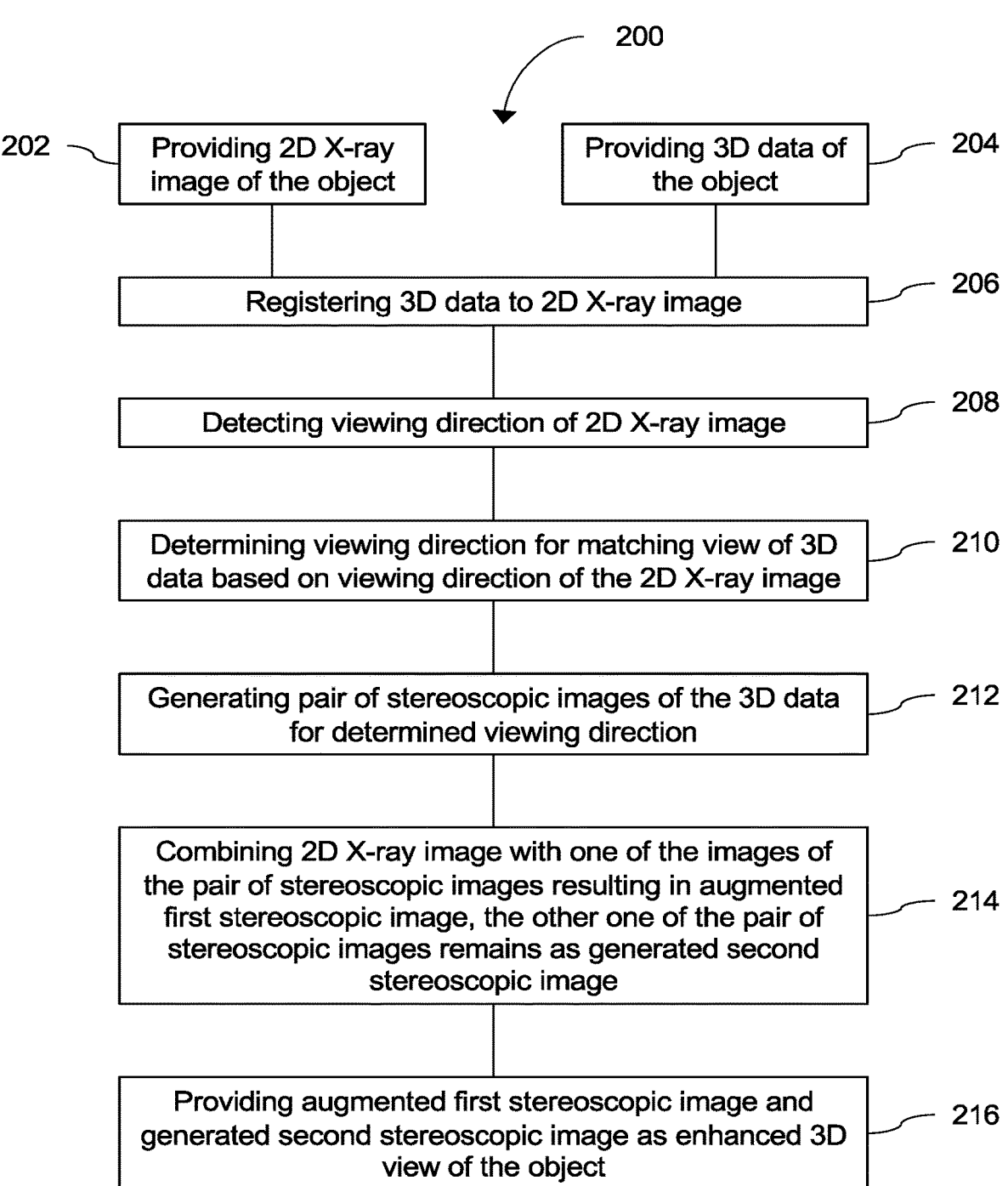

200

202 — Providing 2D X-ray image of the object

Providing 3D data of the object — 204

Registering 3D data to 2D X-ray image — 206

Detecting viewing direction of 2D X-ray image — 208

Determining viewing direction for matching view of 3D data based on viewing direction of the 2D X-ray image — 210

Generating pair of stereoscopic images of the 3D data for determined viewing direction — 212

Combining 2D X-ray image with one of the images of the pair of stereoscopic images resulting in augmented first stereoscopic image, the other one of the pair of stereoscopic images remains as generated second stereoscopic image — 214

Providing augmented first stereoscopic image and generated second stereoscopic image as enhanced 3D view of the object — 216

Fig. 6

OBJECT VISUALIZATION

CROSS-REFERENCE TO PRIOR APPLICATIONS

This application is the U.S. National Phase application under 35 U.S.C. §371 of International Application No. PCT/EP2021/082731, filed on Nov. 24, 2021, which claims the benefit of European Patent Application No. 20212510.0, filed on Dec. 8, 2020. These applications are hereby incorporated by reference herein.

FIELD OF THE INVENTION

The present invention relates to an object visualization device, to a system for object visualization and to a method for visualizing an object of interest, as well as to a computer program and a computer readable medium.

BACKGROUND OF THE INVENTION

For medical procedures, such as interventions, different imaging techniques are used to provide the user with object related information in addition to the user's own view. For example, X-ray imaging is used for visualization of areas of interest inside a subject, like visualizing a vascular structure. X-ray based acquired image data can also be used to generate a 3D model for further visualization, such as for a spatial presentation. As an example, US 2018/0310907 A1 relates to providing visualizations of an object. According to its abstract, a computer system that provides a simulated 2D fluoroscopy image is described. During operation, the computer system may generate the simulated 2D fluoroscopy image based on data in a predetermined 3D image associated with an individual's body. For example, generating the simulated 2D fluoroscopy image may involve a forward projection. Moreover, the forward projection may involve calculating accumulated absorption corresponding to density along X-ray lines through pixels in the predetermined 3D image. Then, the computer system may provide the simulated 2D fluoroscopy image with a 3D context associated with a predefined cut plane in the individual's body. However, it has been shown that the setup is quite complex.

SUMMARY OF THE INVENTION

There may thus be a need for a facilitated visualization of a subject's interior structure.

The object of the present invention is solved by the subject-matter of the independent claims; further embodiments are incorporated in the dependent claims. It should be noted that the following described aspects of the invention apply also for the object visualization device, for the system for object visualization and for the method for visualizing an object of interest.

According to the present invention, an object visualization device is provided that comprises an image supply, a data processor and an output. The image supply is configured to provide a 2D X-ray image of the object. The image supply is also configured to provide 3D image data of the object. The data processor is configured to register the 3D image data to the 2D X-ray image. The data processor is also configured to detect a viewing direction used for generating the 2D X-ray image. The data processor is further configured to determine a viewing direction for projecting the 3D image data to generate a matching view of the 3D image data based on the viewing direction used for generating the 2D X-ray image. The data processor is still further configured to generate a pair of stereoscopic images of the 3D image data for the determined viewing direction and to combine the 2D X-ray image with one of the images of the pair of stereoscopic images resulting in an augmented first stereoscopic image, whereas the other one of the pair of stereoscopic images remains as a generated second stereoscopic image. The output is configured to provide the augmented first stereoscopic image and the generated second stereoscopic image as an enhanced pair of stereoscopic images providing an augmented 3D view of the object.

As an advantage, the user is provided with both the spatial, i.e. three-dimensional information as well as the content of the X-ray image, while modifying only one of the stereoscopic images.

The term "to register" refers to linking the 3D image data of the object to the 2D X-ray image in such a way that the 2D X-ray image and the 3D image data of the object are aligned to each other in terms of viewing perspective. For example, the 2D X-ray image is taken with a certain imaging perspective, i.e. a certain image acquisition geometry resulting in the particular 2D X-ray image with an image plane, i.e. the plane of the detector collecting the projected and thus attenuated X-ray radiation beam, and the X-ray radiation direction of the generated X-ray beam. As an example, the 3D image data is arranged in relation to the 2D X-ray image such that an image generation using the 3D image data would result in a similar X-ray image when acquired with the same geometry.

For example, the 3D data of the object refers to 3D image data of the object. The term "to register" may thus refer to registering the 3D image data of the object to the 2D X-ray image in such a way that the 2D X-ray image and the 3D image data of the object are aligned within the same spatial reference, i.e. they are registered into the same coordinate system.

The term "to detect a viewing direction of the 2D X-ray image" refers to detecting the imaging direction of an X-ray imaging system with an X-ray source generating the X-ray radiation and an X-ray detector detecting the generated X-ray radiation attenuated by the object when passing through the object.

For example, the viewing direction of the X-ray imaging system is detected that was used for generating the 2D X-ray image.

The term "to determine a viewing direction for a matching view of the 3D data based on the viewing direction of the 2D X-ray image" refers to determining a projection direction to be applied to the 3D data, e.g. the 3D image data of the object to generate a projection in an image plane that would show a similar image result as the 2D X-ray image.

For example, the viewing direction for a simulated projection of an X-ray imaging system is determined that would result in an image matching the 2D X-ray image. For example, the "matching view" relates to a "matching image" or comparable image result.

As an example, an object visualization device is provided that comprises an image supply, a data processor and an output. The image supply is configured to provide a 2D X-ray image of the object and to provide 3D data of the object. The data processor is configured to register the 3D data to the 2D X-ray image; to detect a viewing direction of the 2D X-ray image; to determine a viewing direction for a matching view of the 3D data based on the viewing direction of the 2D X-ray image; to generate a pair of stereoscopic images of the 3D data for the determined viewing direction; and to combine the 2D X-ray image with one of the images of the pair of stereoscopic images resulting in an augmented first stereoscopic image, whereas the other one of the pair of stereoscopic images remains as a generated second stereoscopic image. The output is configured to provide the augmented first stereoscopic image and the generated second stereoscopic image as an enhanced pair of stereoscopic images providing an augmented 3D view of the object.

In an example, augmented reality (AR) or mixed reality (MR) technology is provided for displaying the combined image set.

This provides the effect that the information is provided to a user's field of view in any working position of that user. By providing the stereoscopic 3D dataset, it is possible to add stereoscopic information to the user's field of view in any working position of that user. As an example, a head-mounted display (HMD) such as the Google Glass or Microsoft HoloLens is provided.

For interventional use, this technology enables applications to render in space 3D anatomical models and (live) X-ray streams. Such functionality helps in better understanding clinical anatomy for navigation in e.g. vascular cases. This supports cases, for example, that require the surgeons to be able to visualize or track the devices as they advance through blood vessels.

By providing the conventional X-ray image in addition to the generated 3D image pair, devices are visualized in two dimensions, but also a sense is given of how devices, vasculature, organs and other tissues relate to each other in 3D.

As an advantage, even though the X-ray shown overlaid on stereoscopic images provides us with a 2D image from a single perspective only, the stereoscopic rendering of a scene that requires two perspectives (one for each eye of the viewer) is provided.

In an example, a visualization engine for the stereoscopic rendering of a scene is provided.

In an example, two offset views are created of the 3D volume to be shown for the left and right eye of the viewer, respectively, based on the lines of sight from each respective eye to the volume. The X-ray image is overlaid for only one of those views.

As an effect, because of the single 2D X-ray image, no depth is implied through binocular parallax. Further as an effect, because of the blending with the 3D model (which is presented for the two perspective views and has the correct binocular parallax), the user combines the two offset views, namely one with 2D X-ray overlay and the other one without an overlay, without being visually jarring. In an example, a small size single-view object is provided to facilitate the user's perception.

It is noted that the X-ray image is used for determining the viewing direction for the projection of the stereoscopic images. The X-ray image is the starting point for the computational spatial setup and thus determines further image generating steps.

According to an example, the augmented first stereoscopic image is a dual-image-source image and the generated second stereoscopic image is a single-image-source image.

The term dual-image-source refers to two different sources providing two different type of images that are then combined as augmented first stereoscopic image. The term single-image-source refers to a single source providing a single type of image that is provided as the second stereoscopic image.

In an example, the augmented first stereoscopic image is an image that comprises image data of two different image sources and the generated second stereoscopic image comprises image data of a single image source.

In an example, the augmented first stereoscopic image is an image that comprises an image from a first image source and an image from a second image source being different than the first image source. The generated second stereoscopic image comprises an image from the first image source only.

In an example, the augmented first stereoscopic image is an image built up by combining an image from a first image source and an image from a second image source being different than the first image source. The combining is provided as an overlay of the two different images. The generated second stereoscopic image comprises an image from the first image source only.

According to an example, the data processor is configured such that the combination of the 2D X-ray image with one of the images of the pair of stereoscopic images comprises to overlay the 2D X-ray image on the one of the images of the pair of stereoscopic images.

In another example, the data processor is configured such that the combination of the 2D X-ray image with one of the images of the pair of stereoscopic images comprises to overlay the one of the images of the pair of stereoscopic images on the 2D X-ray image.

According to an example, the data processor is configured to provide the combination such that in the augmented first stereoscopic image, i) an image portion covered by the 2D X-ray image is smaller than a portion covered by the generated stereoscopic image. As an additional or alternative option, the data processor is configured to provide the combination such that in the augmented first stereoscopic image, ii) the 2D X-ray image is provided with a transparency that is larger than a transparency of the generated stereoscopic image.

According to the present invention, also a system for object visualization is provided. The system comprises a first image display, a second image display and an object visualization device of one of the preceding claims. One of the first image display and the second image display is configured to present the augmented first stereoscopic image to one of two eyes of the user. The other one of the first image display and the second image display is configured to present the generated second stereoscopic image to the other one of the two eyes of the user.

In an example, the system comprises a first image display, a second image display and an object visualization device of one of the preceding claims. One of the first image display and the second image display is configured to present the augmented first stereoscopic image to the user. The other one of the first image display and the second image display is configured to present the generated second stereoscopic image to the user.

According to an example, a display device is provided that comprises the first image display and the second image display. In an option, the display device is a head mounted display providing a presentation for each of the user's eyes, and the augmented first stereoscopic image is provided to one of the user's eyes and the generated second stereoscopic image is provided to the other one of the user's eyes.

According to an example, the display device is an augmented reality display providing the enhanced pair of stereoscopic images as the augmented 3D view of the object overlaid to a view of a current live situation.

According to the present invention, also a method for visualizing an object of interest is provided. The method comprises the following steps:

providing a 2D X-ray image of the object;

providing 3D data of the object, e.g. 3D image data;

registering the 3D image data to the 2D X-ray image;

detecting a viewing direction used for generating the 2D X-ray image;

determining a viewing direction for projecting the 3D image data to generate a matching view of the 3D image data based on the viewing direction used for generating the 2D X-ray image;

generating a pair of stereoscopic images of the 3D image data for the determined viewing direction;

combining the 2D X-ray image with one of the images of the pair of stereoscopic images resulting in an augmented first stereoscopic image, whereas the other one of the pair of stereoscopic images remains as a generated second stereoscopic image; and providing the augmented first stereoscopic image and the generated second stereoscopic image as an enhanced 3D view of the object.

According to an example, the registering of the 3D image data to the 2D X-ray image accounts for an inverse perspective of the 2D X-ray image, which comprises a focal point and converging beams in relation to the object and the viewing direction of the X-ray radiation.

The term "inverse perspective" relates to the fact that a 2D X-ray image, when generated by an X-ray beam, is based on a fan- or cone-shaped beam that has a focal point at its start and that diverges towards the detector. Since the radiation direction is from source to detector, i.e. from focal point to wider beam, the "viewing" direction of such X-ray is diverging as well. In visual perspectives, in a certain way the contrary is provided: The viewing direction goes towards a focal point, i.e. converging in viewing direction.

In an example, the registering of the 3D data to the 2D X-ray image accounts for an inverse perspective of the 2D X-ray image, the registering of the 3D data to the 2D X-ray image accounts for an inverse perspective of the 2D X-ray image. According to an aspect, a single 2D X-ray image is overlaid for only one of the offset views used to create the stereoscopic view of a 3D volume. The offset views provide visual depth information, also referred to as spatial information, of the object and the single 2D X-ray provides additional information of a region of interest of the object. By providing this 2D X-ray image in the context of one of the stereoscopic views, the information of the 2D X-ray is transferred from the two-dimensional world of the X-ray image into the three-dimensional world of the stereoscopical view.

According to an aspect, a first display image (for one of the eyes) is generated that blends a 3D model with a 2D (live) X-ray image. Further, a second display image (for the other eye) is generated that displays the 3D model only but rendered from a different perspective. Further, the orientation of that other eye is matched.

According to an aspect, an object visualization device is provided comprising an image supply, a data processor and an output. The image supply provides a 2D X-ray image of the object and also 3D data of the object. The data processor registers the 3D data to the 2D X-ray image and detects a viewing direction of the 2D X-ray image. The data processor also determines a viewing direction for a matching view of the 3D data based on the viewing direction of the 2D X-ray image. The data processor generates a pair of stereoscopic images of the 3D data for the determined viewing direction and combines the 2D X-ray image with one of the images of the pair of stereoscopic images resulting in an augmented first stereoscopic image, whereas the other one of the pair of stereoscopic images remains as a generated second stereoscopic image. The output provides the augmented first stereoscopic image and the generated second stereoscopic image as an enhanced pair of stereoscopic images providing an augmented 3D view of the object. Although only one of the stereoscopic images is provided with the additional X-ray image content information, in the combined view by both eyes, the X-ray information is also transferred to the other non-modified image. Thus, the X-ray information is extended into the spatial content. As an advantage, only one X-ray image is needed which means less X-ray exposure for the subject.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 6 shows basic steps of an example of a method for visualizing an object of interest.

DETAILED DESCRIPTION OF EMBODIMENTS

Figure 1:
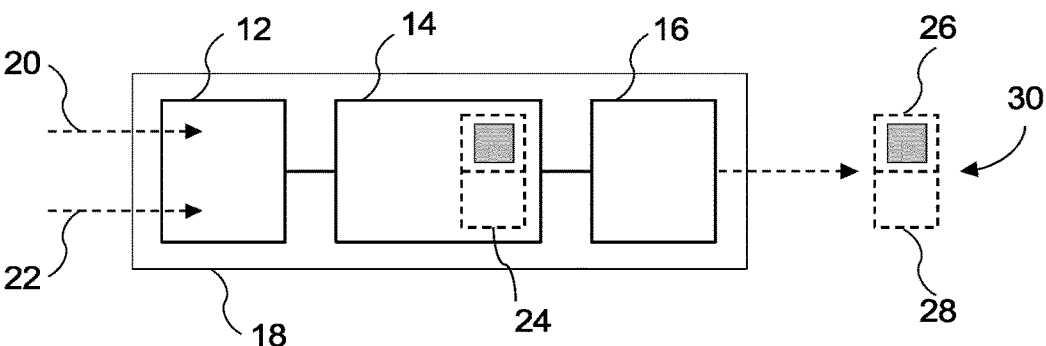
FIG. 1 schematically shows an example of an object visualization device.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows an example of an object visualization device 10 that comprises an image supply 12, a data processor 14 and an output 16.

The image supply 12, the data processor 14 and the output 16 can be provided in an integrated manner in a common structure such as a housing, as indicated with a frame 18. Alternatively, they can also be provided in a separated manner, data connected with each other.

The image supply 12 is configured to provide a 2D X-ray image of the object, indicated with a first hashed line 20. The image supply 12 is also configured to provide 3D data of the object, indicated with a second hashed line 22. In an example, the 3D data of the object is provided as 3D image data of the object The data processor 14 is configured to register the 3D data, e.g. the 3D image data, to the 2D X-ray image. The data processor 14 is also configured to detect a viewing direction used for generating the 2D X-ray image and to determine a viewing direction for projecting the 3D image data to generate a matching view of the 3D image data based on the viewing direction used for generating the 2D X-ray image. The data processor 14 is further configured to generate a pair of stereoscopic images 24 of the 3D image data for the determined viewing direction and to combine the 2D X-ray image with one of the images of the pair of stereoscopic images resulting in an augmented first stereoscopic image 26, whereas the other one of the pair of stereoscopic images remains as a generated second stereoscopic image 28.

The output 16 is configured to provide the augmented first stereoscopic image 26 and the generated second stereoscopic image 28 as an enhanced pair 30 of stereoscopic images providing an augmented 3D view of the object.

The term "object visualization" relates to providing a presentation (or image) of an object. The object is visualized by this presentation provided in a visible way to the user. The augmented 3D view of the object can also be referred to as an object visualization. The image supply 12 can also be referred to as image data supply, as image input, as input or as input unit.

In an example, the image supply 12 is data-connectable to an imaging source arrangement like an X-ray imaging apparatus providing the 2D X-ray image of the object. In an example, the image supply is data-connectable to a data storage having stored the 2D X-ray image of the object.

In an example, the image supply is data-connectable to an imaging source arrangement like a CT X-ray imaging apparatus providing the 3D data of the object. In an example, the image supply is data-connectable to a data storage having stored the 3D data of the object.

The data processor 14 can also be referred to as data processing arrangement, as processor unit or as processor. In an example, the data processor is data-connected to the image supply and the output. The data processor 14 is provided as visualization engine that renders the two views of the 3D model for the two stereoscopic views from the perspective matching the acquired X-ray orientation.

The output 16 can also be referred to as output unit. In an example, the output 16 is data-connected to a display arrangement. In another example, the output 16 is data-connectable to a display arrangement. For example, the output 16 is configured to provide enhanced pair of stereoscopic images to a clinician, thus providing an augmented 3D view of the object.

The data processor 14 is configured to combine the 2D X-ray image with only one of the images of the pair of stereoscopic images.

The term "pair of stereoscopic images" relates to two separate images depicting a left-eye view and a right-eye view of the same object. Although presented as an image on a 2D surface, the difference between the resulting views due to parallax provide the user with depth information, i.e. spatial information. The enhanced pair of stereoscopic images comprises a first image with a first generated view of the 3D data and a second image with a second generated view of the 3D data.

In an example, the data processor 14 is configured to take the pair of the generated stereoscopic images and to combine one image of the image pair with the 2D X-ray image and to maintain the other image of the image-pair, wherein a pair of images is thus provided that comprises one X-ray information enhanced generated image data and one purely generated stereoscopic image.

In an example, the data processor 14 is configured to take the pair of the generated stereoscopic images depicting left-eye and right-eye views of the same object, and to combine one of the left-eye and right-eye views with the 2D X-ray image and to maintain the other one of the left-eye and right-eye views, wherein a pair of eye views is thus provided that comprises one X-ray information enhanced eye view and one purely 3D data based generated eye view.

The enhanced pair of stereoscopic images provides a partly-augmented 3D view of the object by providing the spatial information in form of the stereoscopic view of the pair of images and by providing the additional X-ray information in only one of the images.

In an example, the data processor 14 is configured to generate a stereoscopic image pair with a first and a second stereoscopic image of the 3D data for the determined viewing direction; to combine the 2D X-ray image with one of the first and the second stereoscopic images resulting in an augmented first stereoscopic image; and to maintain the other one of the first and the second stereoscopic images as a generated second stereoscopic image.

In an example, the data processor 14 is configured to generate a stereoscopic image pair with a first and a second stereoscopic image of the 3D data for the determined viewing direction, and to combine the 2D X-ray image with one of the first and the second stereoscopic images. The resulting stereoscopic image pair comprises a first and a second image, wherein the first and the second image comprise different type of image content. One of the two images comprises additional X-ray image content. As an example, the one of the two images comprises additional X-ray fluoroscopy image content combined with the generated view of the 3D data. Both of the two images show the same option with a slightly displaced point of view to provide a stereoscopic view for the user. The second one of the first and the second stereoscopic images is thus provided as a pure generated second stereoscopic image.

In an example, the second one of the first and the second stereoscopic images is provided as a combination-free second image and the first one of the first and the second stereoscopic images is provided as a combination first image, also referred to as combined first image. The combination-free second image can also be referred to as single-source image, and the combination first image can also be referred to as dual-source image, or multi-source image.

In an example, the second one of the first and the second stereoscopic images is provided as an overlay-free second image and the first one of the first and the second stereoscopic images is provided as an overlay first image, also referred to as overlaid first image.

In an example, the first one of the first and the second stereoscopic images is provided as double-data-source image, wherein the double-data-source comprises data from the 2D X-ray image of the object and the 3D data of the object. The second one of the first and the second stereoscopic images is provided as single-data-source image, wherein the single-data-source is the 3D data of the object.

It is noted that the terms "first" and "second" are provided to differentiate between the two images of the respective pair of images provided for the stereoscopic view. The terms do not imply any chronological order or other preference.

It is further noted that the terms "right" and "left" are provided to define that the two images are provided for two displaced eyes of a user, the displacement thus providing the basis for stereoscopic, i.e. spatial viewing. The terms do not provide and limitation to an actual left or right view of a user. Instead of "left and right", also "first and second" or "one and another" can be used.

As an option, the 3D data is provided as pre-operatively generated image data of the object. As a further option, the 2D X-ray image is provided as inter-operative, current or live image, e.g. taken during an examination, intervention or other medical procedure.

For example, the 3D data is based on CT X-ray images. Alternatively, or in addition to X-ray imaging, other imaging sources like e.g. ultrasound imaging or MRI are used to generate the 3D data.

In an example, not further shown in detail, the augmented first stereoscopic image is a dual-image-source image and the generated second stereoscopic image is a single-image-source image.

In an example, not further shown in detail, the data processor 14 is configured such that the combination of the 2D X-ray image with one of the images of the pair of stereoscopic images comprises to overlay the 2D X-ray image on the one of the images of the pair of stereoscopic images.

In an example, also not further shown in detail, the data processor 14 is configured to provide the combination such that in the augmented first stereoscopic image, an image portion covered by the 2D X-ray image is smaller than a portion covered by the generated stereoscopic image.

In addition or alternatively, the 2D X-ray image is provided with a transparency that is larger than a transparency of the generated stereoscopic image.

To provide the X-ray image content in a reduced manner, e.g. by smaller portion or increased transparency, results in that the stereoscopic effect is not substantially affected by the combination with the X-ray information in only one of the views.

In an example, not further shown in detail, the data processor 14 is configured to adjust the image portion of the generated stereoscopic image covered by the 2D X-ray image to be at maximum 75%.

The image portion of the generated stereoscopic image covered by the 2D X-ray image is thus at maximum 75% of the (image) surface of the first stereoscopic image actually provided to the user. The other at minimum 25% of the (image) surface of the first stereoscopic image actually provided to the user remains uncovered by the 2D X-ray image.

Thus, the augmented first stereoscopic image comprises an image area, or image surface, which is showing at least a part of the first stereoscopic image that is not overlaid by the X-ray image, but which part is so-to-speak unaffected by the combination of the two images. Hence, the augmented first stereoscopic image comprises a primary part that is having an overlay of the 2D X-ray image on the first stereoscopic image, and a secondary part that is not having any overlay of the 2D X-ray image on the first stereoscopic image, but purely the first stereoscopic image.

In an example, the image portion covered by the 2D X-ray image is at least smaller than half of the portion covered by the generated stereoscopic image.

In an example, the data processor is configured to adjust the transparency of the 2D X-ray image to be larger, e.g. at least 25% larger, than the transparency of the generated stereoscopic image, when the 2D X-ray image is projected on the one of the images of the pair of stereoscopic images.

In an alternative example, the data processor 14 is thus configured to adjust the transparency of the generated stereoscopic image to be larger, e.g. at least 25% or a third larger, than the transparency of the 2D X-ray image, when the one of the images of the pair of stereoscopic images is projected on the 2D X-ray image.

In an example, not further shown in detail, the registering comprises a spatial registration of the 2D X-ray image in relation to the 3D image data. The term "spatial" registration relates to link the 2D X-ray image to the reference frame, or spatial coordinate system, of the 3D image data.

Figure 2:
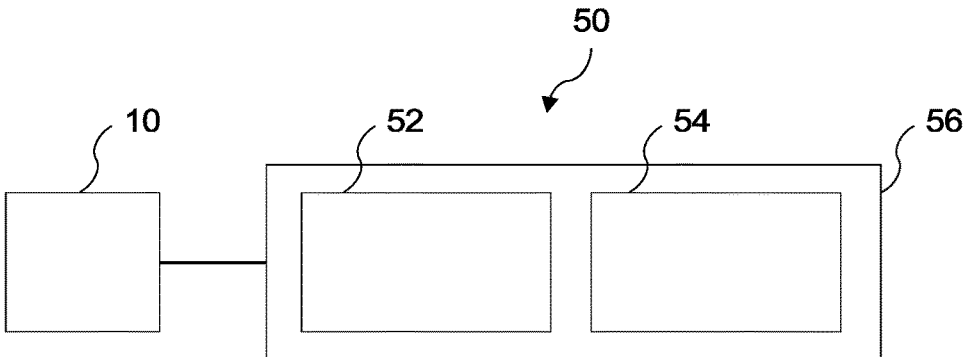
FIG. 2 schematically shows an example of a system for object visualization.

FIG. 2 schematically shows an example of a system 50 for object visualization. The system 50 comprises a first image display 52, a second image display 54 and an example of the object visualization device 10 of one of the preceding examples. One of the first image display 52 and the second image display 54 is configured to present the augmented first stereoscopic image to one of two eyes of the user. The other one of the first image display 52 and the second image display 54 is configured to present the generated second stereoscopic image to the other one of the two eyes of the user.

In an example indicated in FIG. 2 as an option, a display device 56 (indicated with a frame) is provided that comprises the first image display 52 and the second image display 54.

In an option, the display device 56 is a head mounted display (see below) providing a presentation for each of the user's eyes. The augmented first stereoscopic image is provided to the one of the user's eyes and the generated second stereoscopic image is provided to the other one of the user's eyes.

Figure 3:
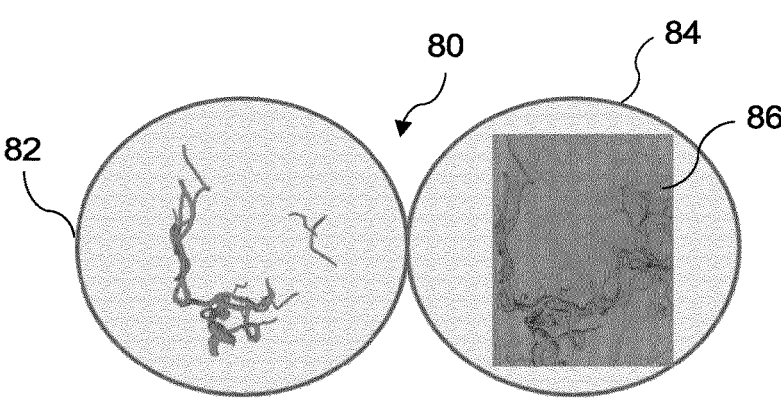
FIG. 3 shows an example of a pair of stereoscopic images as presented to the user.

FIG. 3 shows an example of a pair of stereoscopic images as presented to the user. In FIG. 3, a pair 80 of generated images is shown comprising a first image 82, or first image section, and a second image 84, or second image section, as an example, i.e. offset views used to create the stereoscopic view of a 3D volume. The first image 82 and the second image 84 each show a projection of a generated 3D model of the vasculature structure. The projections are having slightly different viewing directions to achieve the stereoscopic effect for the user. A single 2D X-ray image 86 is overlaid for only one of the offset views. The 2D X-ray image 86 shows the vascular structure, e.g. visible due to contract injection. The first image 82 may be provided as left eye image and the second image 84 may be provided as right eye image.

Figure 4:
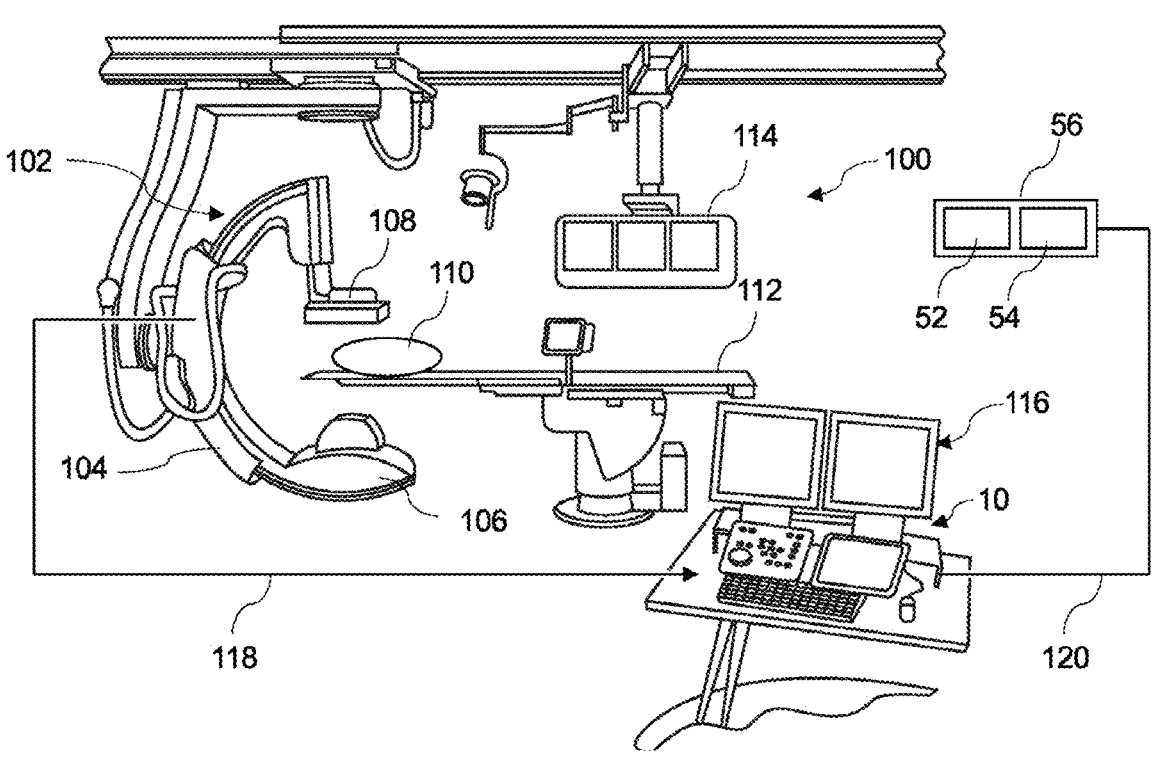
FIG. 4 shows an example of the system for object visualization in the context of an interventional room with an X-ray imaging system.

FIG. 4 shows an example of the system 50 for object visualization in the context of an interventional room 100 with an X-ray imaging system 102 comprising a C-arm 104 with an X-ray source 106 and an X-ray detector 108. An object of interest, e.g. a subject 110, is arranged on a subject support 112. Display and lighting arrangement 114 is also indicated. A console 116 is shown in the foreground that comprises the object visualization device 10 and together with the display device 56 having the first image display 52 and the second image display 54 forms the system 50 for object visualization. The console van also be configured to control the operation of the various equipment in the interventional room 100. As an example, the X-ray imaging system 102 provides current, i.e. live images to the console 116, as indicated with a first data connection line 118. A second data connection line 120 indicates the data supply from the visualization device 10 to the display device 56. For example, the display device 56 is provided as a head mounted device as shown in FIG. 5.

Figure 5:
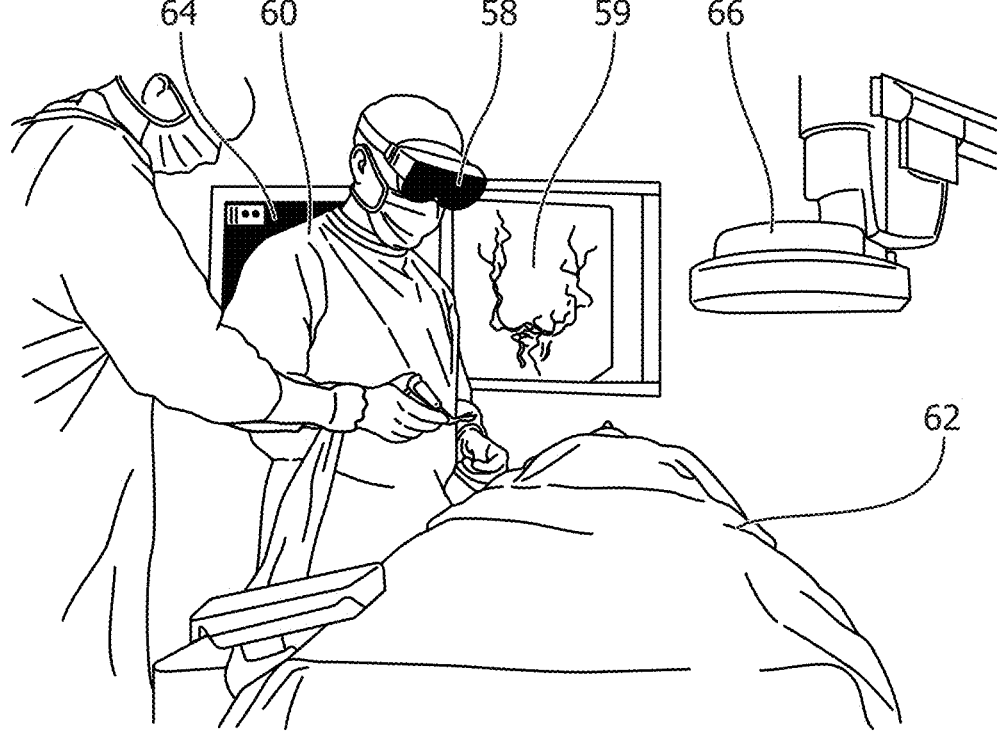
FIG. 5 shows an example of a head mounted device for displaying an augmented first stereoscopic image and the generated second stereoscopic image as an enhanced 3D view of the object.

FIG. 5 schematically shows an example of the display device 56 as a head mounted display 58 providing a presentation for each of the user's eyes. The head mounted display 58 is configured for displaying the augmented first stereoscopic image 26 and the generated second stereoscopic image 28 as an enhanced 3D view of the object. The augmented first stereoscopic image 26 is provided to one of the user's eyes and the generated second stereoscopic image 28 is provided to the other one of the user's eyes. Such virtual image presented to the user is indicated with a projection 59 which provides the user with the spatial information in form of the pair of the two stereoscopic images, one for each eye. The projection 59 also provides the user with the additional information in form of the overlaid X-ray image visible by the user's right or left eye.

As an example, a user 60 like a surgeon is shown besides a subject 62 on a subject support. Further staff members are also indicated. A display 64 is shown in the background and a C-arm X-ray imaging system 66 is indicated in the right part of the illustration.

For example, the head mounted display comprises two separate displays.

An example for the head mounted display are the glasses known as Hololens from Microsoft or the Magic Leap.

Alternatively, the display device comprises a single display, but with distinct projections for the two eyes of the user. As an example, filters or optical elements can be provided for the user to enable to provide each eye with only the designated image content.

In an option, the display device is an augmented reality display providing the enhanced pair of stereoscopic images as the augmented 3D view of the object overlaid to a view of a current live situation.

In an alternative option, the display device is a virtual reality display providing the enhanced pair of stereoscopic images as the augmented 3D view of the object.

FIG. 6 shows basic steps of an example of a method 200 for visualizing an object of interest. The method 200 comprises the following steps: In a first step 202, a 2D X-ray image of the object is provided. In a second step 204, 3D data of the object is provided. The first step 202 and the second step 204 can take place in this order or reversed or at the same time. In a third step 206, the 3D data is registered to the 2D X-ray image. In a fourth step 208, a viewing direction of the 2D X-ray image is detected. In a fifth step 210, a viewing direction for a matching view of the 3D data is determined based on the viewing direction of the 2D X-ray image. In a sixth step 212, a pair of stereoscopic images of the 3D data is generated for the determined viewing direction. In a seventh step 214, the 2D X-ray image is combined with one of the images of the pair of stereoscopic images resulting in an augmented first stereoscopic image, whereas the other one of the pair of stereoscopic images remains as a generated second stereoscopic image. In an eighth step 216, the augmented first stereoscopic image and the generated second stereoscopic image are provided as an enhanced 3D view of the object.

The one of the images of the pair of stereoscopic images is also referred to as the first stereoscopic image and the other one of the pair of stereoscopic images is referred to as the second stereoscopic image. The first and the second stereoscopic images are also referred to as the left and right stereoscopic images (or right and left stereoscopic images).

The pair of stereoscopic images comprises a left eye's view image and a right eye's view image.

In an example, the combining of the 2D X-ray image with one of the images of the pair of stereoscopic images comprises projecting the one of the images of the pair of stereoscopic images on the 2D X-ray image.

In an example, the one of the images of the pair of stereoscopic images comprises active image pixels on a clear/transparent background. For example, the active image pixels comprise pixels in black or color.

In an example, the registering comprises a spatial registration of the 2D X-ray image in relation to the 3D data.

In an example, the registering of the 3D data to the 2D X-ray image accounts for an inverse perspective of the 2D X-ray image.

In an option, the inverse perspective comprises a focal point and converging beams in relation to the object and the viewing direction of the X-ray radiation.

In an example, in the augmented first stereoscopic image, an image portion covered by the 2D X-ray image is smaller than a portion covered by the generated stereoscopic image. In an example, provided alternatively or in addition, in the augmented first stereoscopic image, the 2D X-ray image is provided with a transparency that is larger than a transparency of the generated stereoscopic image.

In an example, the image portion covered by the 2D X-ray image is at least approximately 30% smaller than the portion covered by the generated stereoscopic image. For example, the image portion covered by the 2D X-ray image is approximately 50% smaller. The term "approximately" refers to a deviation of up to +/−10% of the respective portion percentage value.

In an example, the transparency of the 2D X-ray image is at least approximately 30% higher than the transparency of the generated stereoscopic image. For example, the transparency of the 2D X-ray image is approximately 50% higher. The term "approximately" refers to a deviation of up to +/−10% of the respective transparency percentage value.

In an example of the method, the augmented first stereoscopic image is presented to a first eye of a user and the generated second stereoscopic image is presented to a second eye of the user.

In an example of the method, the augmented first stereoscopic image and the generated second stereoscopic image are provided as virtual screens projected on a head mounted viewing device.

In an example, a visualization engine is used to render the 3D model from the perspective matching the X-ray orientation. For one of the eyes, a scene is created that blends this 3D model with the 2D (live) X-ray image. For the other eye, a scene is created with only the 3D model, but rendered from a different perspective, matching the orientation of that eye.

In an example, a manner of overlaying X-ray is provided without implying depth: no depth of the plane in which the image is placed and no depth within the image (e.g. vessels running at different depths).

This is suitable with augmented reality concepts and virtual reality concepts and other variants that use stereoscopic viewing. The idea that one object can be rendered for a single eye as long as there is sufficient stereoscopically correct data can be used for other medical and non-medical purposes. As an example, a view pointer can be projected in a 3D scene using a single eye.

In another exemplary embodiment of the present invention, a computer program or a computer program element is provided that is characterized by being adapted to execute the method steps of the method according to one of the preceding embodiments, on an appropriate system.

In an example, a computer program or program element for controlling an apparatus according to one of the examples above is provided, which program or program element, when being executed by a processing unit, is adapted to perform the method steps of one of the method examples above.

The computer program element might therefore be stored on a computer unit or be distributed over more than one computer units, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

As discussed above, the processing unit, for instance a controller implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated, and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An object visualization device comprising:
an image supply configured to provide a 2D X-ray image of the object and 3D image data of the object; and
a processor configured to:
register the 3D image data to the 2D X-ray image;
detect a viewing direction used for generating the 2D X-ray image;
determine a viewing direction for projecting the 3D image data to generate a matching view of the 3D image data based on the viewing direction used for generating the 2D X-ray image;
generate a pair of stereoscopic images of the 3D image data for the determined viewing direction;
combine the 2D X-ray image with one of the images of the pair of stereoscopic images resulting in an augmented first stereoscopic image, whereas the other one of the pair of stereoscopic images remains as a generated second stereoscopic image; and
provide the augmented first stereoscopic image and the generated second stereoscopic image as an enhanced pair of stereoscopic images providing an augmented 3D view of the object.

2. The device of claim 1, wherein the augmented first stereoscopic image is a dual-image-source image and the generated second stereoscopic image is a single-image-source image.

3. The device of claim 1, wherein the processor is further configured to overlay the 2D X-ray image on the one of the images of the pair of stereoscopic images.

4. The device of claim 1, wherein the augmented first stereoscopic image is provided to include at least one of:

i) an image portion covered by the 2D X-ray image that is smaller than a portion covered by the generated stereoscopic image; and ii) the 2D X-ray image with a transparency that is larger than a transparency of the generated stereoscopic image.

5. The device of claim 4, wherein the processor is further configured to adjust the image portion of the generated stereoscopic image covered by the 2D X-ray image to be at maximum 75%.

6. The device of claim 1, wherein the registration of the 3D image data to the 2D X-ray image comprises a spatial registration of the 2D X-ray image in relation to the 3D image data.

7. A system for object visualization, the system comprising:

a first image display;

a second image display; and an object visualization device of claim 1;

wherein one of the first image display and the second image display is configured to present the augmented first stereoscopic image to one of two eyes of the user; and the other one of the first image display and the second image display is configured to present the generated second stereoscopic image to the other one of the two eyes of the user.

8. The system of claim 7, wherein a display device is provided that comprises the first image display and the second image display;

wherein the display device is a head mounted display providing a presentation for each of the user's eyes; and wherein the augmented first stereoscopic image is provided to the one of the user's eyes and the generated second stereoscopic image is provided to the other one of the user's eyes.

9. The system of claim 8, wherein the display device is an augmented reality display providing the enhanced pair of stereoscopic images as the augmented 3D view of the object overlaid to a view of a current live situation.

10. A method for visualizing an object of interest, the method comprising:

providing a 2D X-ray image of the object;

providing 3D image data of the object;

registering the 3D image data to the 2D X-ray image;

detecting a viewing direction used for generating the 2D X-ray image;

determining a viewing direction for projecting the 3D image data to generate a matching view of the 3D image data based on the viewing direction used for generating the 2D X-ray image;

generating a pair of stereoscopic images of the 3D image data for the determined viewing direction;

combining the 2D X-ray image with one of the images of the pair of stereoscopic images resulting in an augmented first stereoscopic image, whereas the other one of the pair of stereoscopic images remains as a generated second stereoscopic image; and providing the augmented first stereoscopic image and the generated second stereoscopic image as an enhanced 3D view of the object.

11. The method of claim 10, wherein the registering of the 3D image data to the 2D X-ray image accounts for an inverse perspective of the 2D X-ray image, which comprises a focal point and converging beams in relation to the object and the viewing direction of the X-ray radiation.

12. The method of claim 10, wherein the augmented first stereoscopic image is a dual-image-source image and the generated second stereoscopic image is a single-image-source image.

13. The method of claim 10, further comprising overlaying the 2D X-ray image on the one of the images of the pair of stereoscopic images.

14. The method of claim 10, wherein the augmented first stereoscopic image is provided to include at least one of:

i) an image portion covered by the 2D X-ray image that is smaller than a portion covered by the generated stereoscopic image; and ii) the 2D X-ray image with a transparency that is larger than a transparency of the generated stereoscopic image.

15. The method of claim 10, wherein the registration of the 3D image data to the 2D X-ray image comprises a spatial registration of the 2D X-ray image in relation to the 3D image data.

16. The method of claim 10, wherein the augmented first stereoscopic image is a dual-image-source image and the generated second stereoscopic image is a single-image-source image.

17. A non-transitory computer-readable storage medium having stored a computer program comprising instructions, which, when executed by a processor, cause the processor to:

register 3D image data of an object to a 2D X-ray image of the object;

detect a viewing direction used for generating the 2D X-ray image;

determine a viewing direction for projecting the 3D image data to generate a matching view of the 3D image data based on the viewing direction used for generating the 2D X-ray image;

generate a pair of stereoscopic images of the 3D image data for the determined viewing direction;

combine the 2D X-ray image with one of the images of the pair of stereoscopic images resulting in an augmented first stereoscopic image, whereas the other one of the pair of stereoscopic images remains as a generated second stereoscopic image; and provide the augmented first stereoscopic image and the generated second stereoscopic image as an enhanced pair of stereoscopic images providing an augmented 3D view of the object.

18. The non-transitory computer-readable storage medium of claim 17, wherein the processor is further configured to overlay the 2D X-ray image on the one of the images of the pair of stereoscopic images.

19. The non-transitory computer-readable storage medium of claim 17, wherein the augmented first stereoscopic image is provided to include at least one of:

i) an image portion covered by the 2D X-ray image that is smaller than a portion covered by the generated stereoscopic image; and ii) the 2D X-ray image with a transparency that is larger than a transparency of the generated stereoscopic image.

20. The non-transitory computer-readable storage medium of claim 17, wherein the registration of the 3D image data to the 2D X-ray image comprises a spatial registration of the 2D X-ray image in relation to the 3D image data.

* * * * *